United States Patent
Balar et al.

(10) Patent No.: US 9,676,207 B2
(45) Date of Patent: Jun. 13, 2017

(54) PRINTER CONTROL MECHANISM FOR A DEVICE HAVING A MOBILE OPERATING SYSTEM

(71) Applicant: Tabletop Media LLC, Dallas, TX (US)

(72) Inventors: Viren R. Balar, Murphy, TX (US); Christopher M. Wellheuser, Plano, TX (US); Jeffrey E. Taylor, Lucas, TX (US); Kevin C. Mowry, Lewisville, TX (US); Tiegang Li, Plano, TX (US)

(73) Assignee: Tabletop Media, LLC, Dallas, TX (US)

( * ) Notice: Subject to any disclaimer, the term of this patent is extended or adjusted under 35 U.S.C. 154(b) by 0 days.

(21) Appl. No.: 13/962,722

(22) Filed: Aug. 8, 2013

(65) Prior Publication Data

US 2014/0139866 A1    May 22, 2014

Related U.S. Application Data

(60) Provisional application No. 61/680,760, filed on Aug. 8, 2012.

(51) Int. Cl.
    *B41J 3/36*          (2006.01)
    *B41J 3/44*          (2006.01)
    *G06F 3/12*          (2006.01)

(52) U.S. Cl.
CPC . *B41J 3/36* (2013.01); *B41J 3/44* (2013.01); *G06F 3/122* (2013.01); *G06F 3/1244* (2013.01); *G06F 3/1279* (2013.01); *G06F 3/1284* (2013.01)

(58) Field of Classification Search
CPC ... G06F 17/30044; G06Q 20/20; G06Q 30/02
USPC ................... 358/1.1–1.9, 1.11–1.18
See application file for complete search history.

(56) References Cited

U.S. PATENT DOCUMENTS

| | | | | |
|---|---|---|---|---|
| 5,812,595 | A * | 9/1998 | Jandu | 375/219 |
| 6,394,572 | B1 * | 5/2002 | Pierce et al. | 347/17 |
| 7,564,580 | B2 * | 7/2009 | Silverbrook | B41J 2/01 347/2 |
| 7,761,114 | B2 * | 7/2010 | Silverbrook et al. | 455/556.1 |
| 2004/0052565 | A1 * | 3/2004 | Takeishi | B41J 19/202 400/283 |
| 2004/0160623 | A1 * | 8/2004 | Strittmatter et al. | 358/1.15 |
| 2004/0253990 | A1 * | 12/2004 | McCoog | H04N 1/00185 455/566 |
| 2007/0247434 | A1 * | 10/2007 | Cradick et al. | 345/173 |
| 2008/0174339 | A1 * | 7/2008 | Taylor | 326/30 |
| 2011/0270813 | A1 * | 11/2011 | Cok et al. | 707/705 |

(Continued)

*Primary Examiner* — Ibrahim Siddo

(57) ABSTRACT

A table-side hospitality device includes an integral printer mechanism, such as a thermal printer. The device comprises a general purpose processing unit on which a mobile- or embedded-device operating system, such as Android, executes. A control program (the device application) executing on the processing unit facilitates ordering, order management, invoicing and payment. When the application needs to print, it interacts with the printer directly, preferably using the general purpose input-output (GPIO) bus of the processor. In particular, during the print operation, the processor (via the general purpose I/O) outputs, as a set of control signals, a bit-map of the desired graphics (text, images, or the like), and these control signals drive the printer directly without requiring a dedicated micro-controller or OS-specific printer drivers.

20 Claims, 4 Drawing Sheets

(56) References Cited

U.S. PATENT DOCUMENTS

| | | | |
|---|---|---|---|
| 2011/0319139 A1* | 12/2011 | Kondo | 455/566 |
| 2012/0002899 A1* | 1/2012 | Orr, IV | G06T 5/50 |
| | | | 382/282 |
| 2012/0038940 A1* | 2/2012 | Boskovic | G06F 3/1206 |
| | | | 358/1.13 |

* cited by examiner

```
typedef struct
{
    int Size;                    // Size of this structure.
    int cx;                      // Specifies the width, in pixels, of the surface.
    int cy;                      // Specifies the height, in pixels, of the surface.
    unsigned int cjBits;         // Specifies the size of the buffer pointed to by pvBits.
    void *pvBits;                // Pointer to surface's pixels (1 bpp, from Android Bitmap structure)
    void *pvScan0;               // Pointer to the beginning of the first scan line.
    int lDelta;                  // Specifies the count of bytes required to move down one scan line
    unsigned int iBitmapFormat;  // Must be set to 1 (1 bit per pixel)
    int left;                    // Coordinate of left edge of the destination rectangle
    int top;                     // Coordinate of top edge of the destination rectangle
    int right;                   // Coordinate of right edge of destination rectangle. (outside image)
    int bottom;                  // Coordinate of right edge of destination rectangle. (outside image)
    unsigned int dpiX;           // Number of pixels per inch along a horizontal line on the printer
    unsigned int dpiY;           // Number of pixels per inch along a vertical line on the printer
    bool fRotate;                // TRUE if image should be printed in landscape mode
    unsigned int darkness;       // Relative measure between 0 (lightest) and 10000 (darkest) print
} t_PRN_RenderImage;
```

PRINTER CONTROL MECHANISM FOR A DEVICE HAVING A MOBILE OPERATING SYSTEM

BACKGROUND

Technical Field

This disclosure relates generally to mechanisms for enhancing the print capabilities of promotion/pay-at-the-table devices that are used in restaurant environments.

Background of the Related Art

A system of digital promotion/pay-at-the-table devices is known in the prior art. One such commercial system is the Ziosk, available from Tabletop Media, Inc., of Dallas Tex.

A Ziosk® device typically is implemented as a standalone apparatus that comprises, within a self-contained housing, a display, a reader, a printer, electronics, and a battery. The housing is configured to position the display to a patron seated at a serving area for order data entry, display of information, and invoicing. A server computer is communicatively coupled to the apparatus over a wireless link and is adapted to transmit a control program to the apparatus, and to transmit the information. A control program executing on the apparatus facilitates order entry, order management, point-of-sale system integration, and pay-at-the-table processing. During the payment workflow, an invoice is displayed, a payment (e.g., via credit or debit card) is received and processed, and the invoice is printed.

In a device of this type, it has also been known to implement the printer using a thermal line printer that is controlled by a dedicated micro-controller chip or device. The requirement for a separate micro-controller, however, is costly, and it makes implementation of device functionality impractical when it is desired to implement the application using a mobile- or embedded-device operating system, such as Android. In particular because most devices that run Android do not host USB devices or even require printing services, the Android operating system does not include support for printer software devices.

It would be desirable to implement a technique to control a printer in an Android-based device without requiring a dedicated micro-controller. The subject matter of this disclosure addresses this need.

BRIEF SUMMARY

According to this disclosure, a table-side hospitality device includes an integral printer mechanism, such as a thermal printer. The device comprises a general purpose processing unit (processor) on which a mobile- or embedded-device operating system, such as Android, executes. A control program (the device application) executing on the processing unit facilitates ordering, order management, invoicing and payment. According to this disclosure, when the application needs to print, it interacts with the printer directly using the general purpose input-output bus of the processor. During the print operation, the processor (via the general purpose I/O) outputs, as a set of control signals, a bitmap of the desired graphics (text, images, or the like), and these control signals drive the printer directly without requiring a dedicated micro-controller or OS-specific printer drivers.

The foregoing has outlined some of the more pertinent features of the subject matter. These features should be construed to be merely illustrative.

BRIEF DESCRIPTION OF THE DRAWINGS

For a more complete understanding of the disclosed subject matter and the advantages thereof, reference is now made to the following descriptions taken in conjunction with the accompanying drawings, in which:

FIG. 4 is an ICOTL (Input Output Control) command data structure to transfer bitmap graphics to the printer driver.

DETAILED DESCRIPTION OF AN ILLUSTRATIVE EMBODIMENT

As noted above, a system of digital promotion/pay-at-the-table devices is known in the prior art. One such commercial system is the Ziosk, available from Tabletop Media, Inc., of Dallas Tex. A Ziosk® device typically is implemented as a standalone apparatus that comprises, within a self-contained housing, a display, a reader, a printer, electronics, and a battery. The housing is configured to position the display to a patron seated at a serving area for order data entry, display of information, and invoicing. A server computer (not shown) is communicatively coupled to the apparatus, typically over a wireless link, and it is adapted to transmit a control program to the apparatus, and to transmit the information. A control program executing on the apparatus facilitates the invoicing by selectively displaying an invoice on the display, receiving a payment, and providing an indication that a payment has been accepted.

Figure 1:
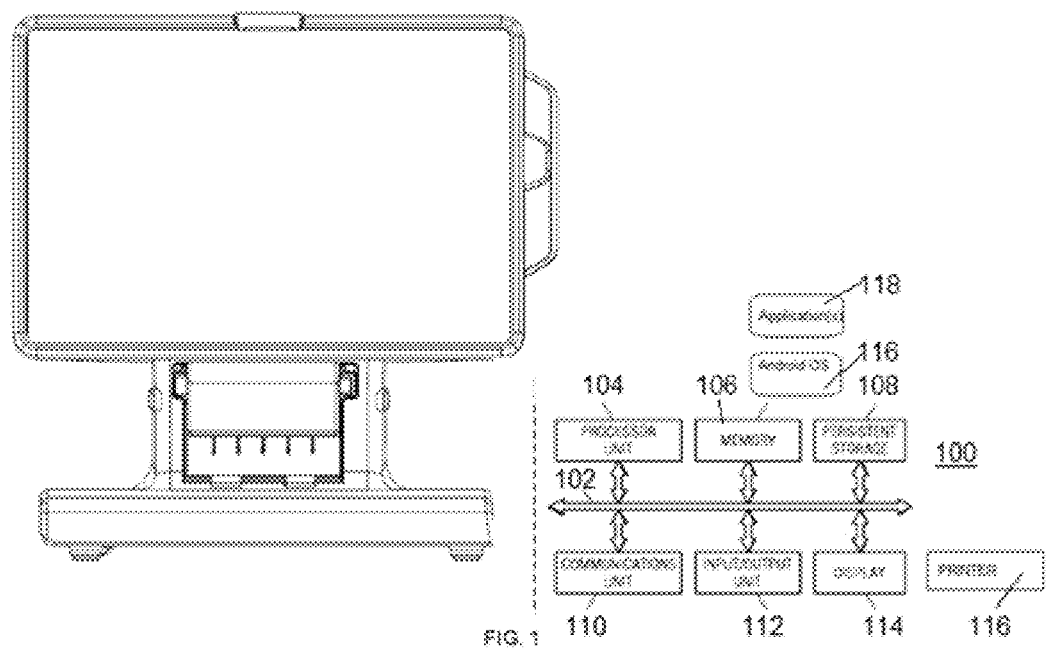
FIG. 1 is a representation of a known table-side device and its control hardware and software.

FIG. 1 illustrates a representative architecture for the device 100, which includes a communications bus 102, which provides communications among a processor 104, memory 106, persistent storage 108, communications unit 110, input/output (I/O) unit 112, display 114, and printer 116. The processor 104 executes instructions for software that may be loaded into memory 106. The memory 106 and persistent storage 108 are storage devices. The communications unit 110 provides for communications with other data processing systems or devices. In these examples, communications unit 110 is a network interface card, or it may provide communications through the use of either or both physical and wireless communications links. The input/output unit 112 allows for input and output of data with other devices that may be connected to data processing system 100. For example, input/output unit 212 may provide a connection for user input through touch screen. Further, input/output unit 112 may send output to the printer 116. Display 114 provides a mechanism to display information to a user. Instructions for the operating system 116 (e.g., Android) and applications or programs 118 are located on persistent storage 108. These instructions are selectively loaded into memory 106 for execution by processor 104.

A device such as described above typically includes a printer 116 for printing information, such as receipts, information messages, graphics, and the like. A representative printer may be a Citizen MLT-289 printer, although this is not a limitation. The techniques herein also are not limited to devices using thermal printers.

Driving a Printer Directly From Processor GPIO

According to this disclosure, a table-side hospitality device such as described above includes an integral printer mechanism, such as a thermal printer. The device comprises a general purpose processing unit (processor) on which a mobile- or embedded-device operating system, such as Android, executes. A control program (the device application) executing on the processing unit facilitates ordering, order management, invoicing and payment. According to this disclosure, when the application needs to print, it interacts with the printer directly using the general purpose input-output bus of the processor. During the print operation, the processor (via the general purpose I/O) outputs, as a set of control signals, a bit-map of the desired graphics (text, images, or the like), and these control signals drive the printer directly without requiring a dedicated micro-controller or OS-specific printer drivers.

Thus, in contrast to the prior art, the processor output drives the printer directly.

Figure 2:
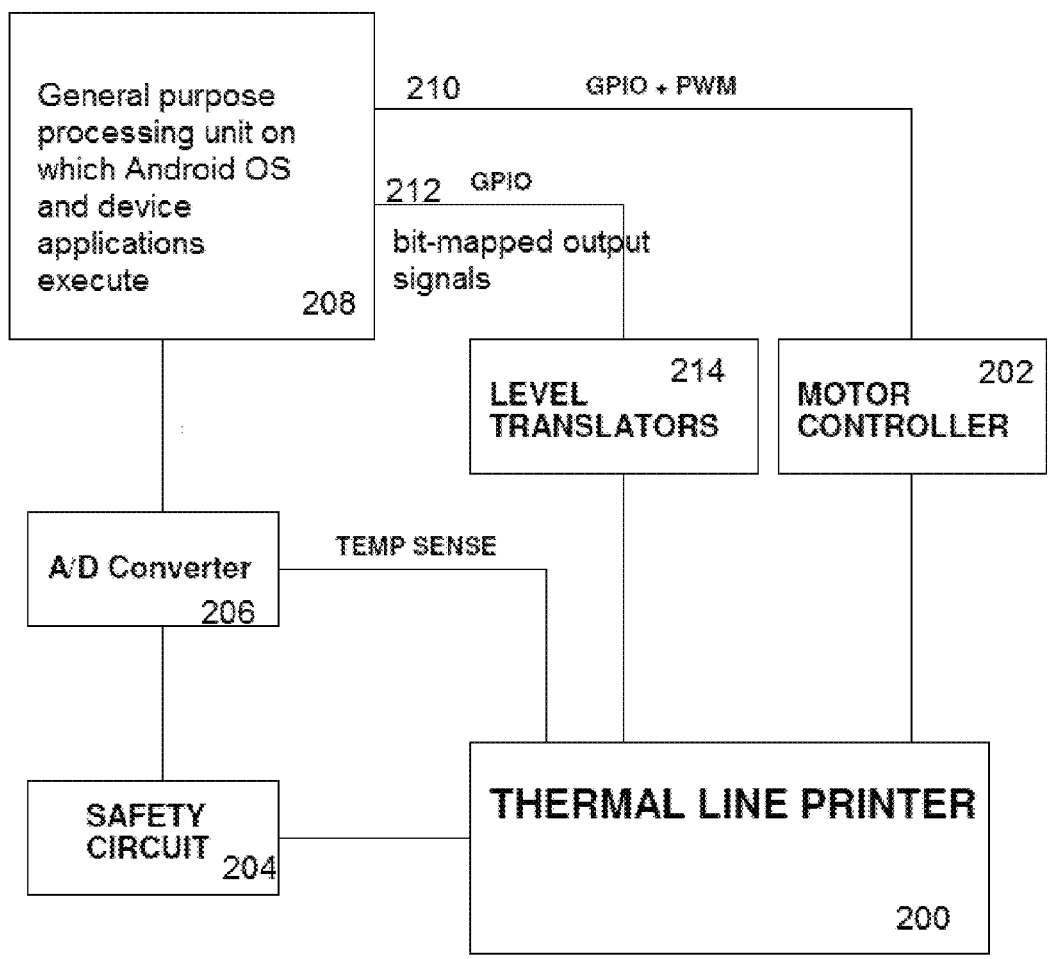
FIG. 2 is a block diagram of a printer control mechanism of this disclosure.

FIG. 2 illustrates a representative block diagram of the printer and associated control circuitry. In this example embodiment, the thermal line printer 200 has an associated motor controller 202 that drives one or more gears of a stepper motor to control movement of a paper in and through the printer itself. A safety circuit 204 monitors for various operating anomalies (e.g., printer door open, out-of-paper conditions, etc.). A temperature sense signal is output and used to control the operation of the thermal printer to prevent over-heating conditions. These signals are converted to digital form using the analog-to-digital convertor 206, and supplied to the general purpose processing unit 208. Processor 208 controls the operation of the overall hospitality device. It includes a first general purpose input/output bus 210 (GPIO+PWM) that it used to output pulse-width modulated (PWM) output signals for controlling the motor controller. These signals advance the paper through the printer. For the purposes of this disclosure, the processor 208 also includes GPIO bus 212, which receives, as a bit-map, the content (text, graphics, etc.) that is to be printed on the paper as it moves through the printer. The bit-mapped output is applied through a level translator circuit 214, which raises the voltage (e.g., from about 1.3V to 5.0V) on these control signals. The control signals are then applied directly to the line printer to print the content.

In the approach in FIG. 2, the processor 208 executes the Android operating system and the device application (typically a set of modules that perform that various operations such as order entry, order management, point-of-sale system integration, providing information services, and payment). When the device application needs to print using the print services, the application generates the desired content as one or more bit-maps, which are then output over the GPIO bus 212 and used to drive the thermal printing elements directly. There is no requirement for a dedicated micro-controller, and this printing is carried out despite the lack of an Android-based printer driver.

Figure 3:
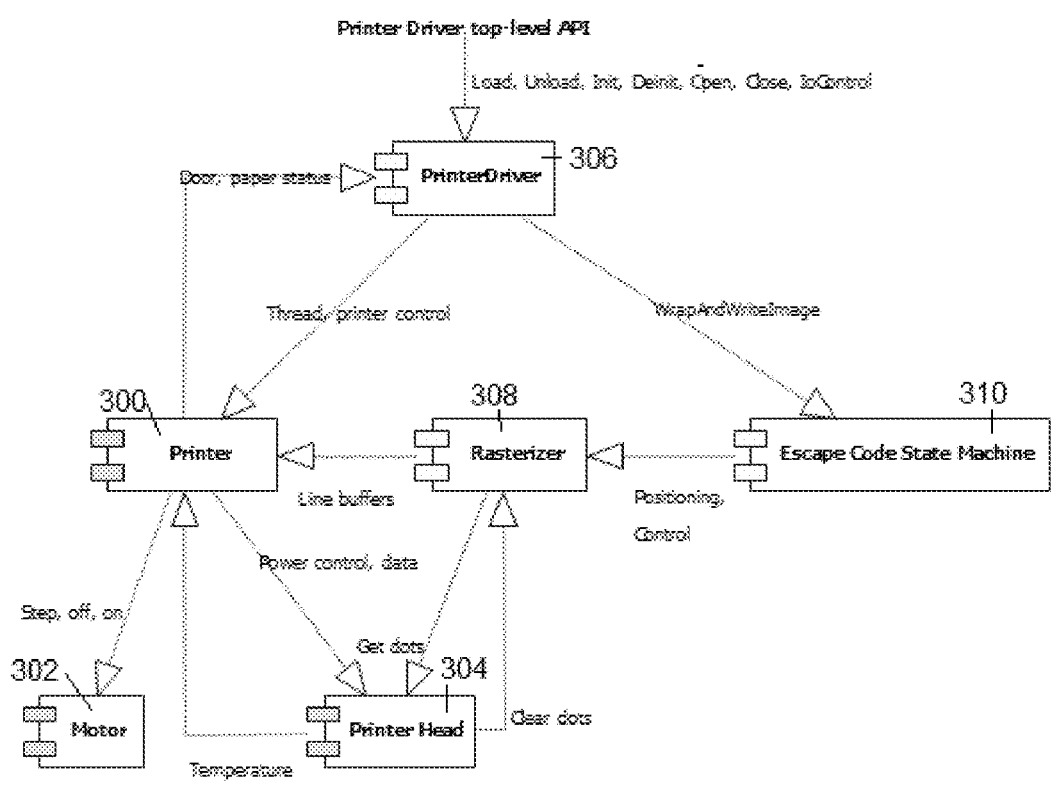
FIG. 3 is a UML diagram of the mechanism.

FIG. 3 is a UML diagram of the software component architecture and functional operations. The components comprise three hardware-related components: printer object 300, motor object 302, and printer head object 304, and three software components: printer driver object 306, rasterizer object 308, and escape code state machine object 310. The printer driver object 306 provides the high level printer API, namely, initialization (calling printer object 300 for hardware-specific initialization), creating/destroying a printer thread, generating I/O for control, status and bitmap graphics, and calling other objects to control and write to the rasterizer object. The motor object 302 provides low-level stepper control, start-up acceleration, backlash compensation, and PWM pulse control. The printer head object 304 provides low-level line buffer manipulation, and strobe and power control. The printer object 300 provides hardware configuration and initialization, temperature monitoring, status and events, door-open monitoring, status and events, paper-out monitoring, status and events, and it also drives the timing of the stepping and strobing. The rasterizer object 308 provides raw image rasterizing, frame buffering, line-by-line input and output (e.g., a FIFO ring buffer), and basic drawing operations (e.g., draw box). The escape code state machine 310 provides wrap and write images, positioning, and other control functions based on the monitoring. The division into multiple objects is not a requirement, as one or more functions may be combined.

The division into multiple objects is not a requirement, as one or more functions may be combined. Thus, and without limitation, the printer object 300, motor object 302 and printer head object 304 may be implemented in a unitary object, and one that typically is tightly-coupled with the printer mechanism. The other modules 306, 308 and 310 are independent and may be used with other hardware.

The general operation for printing is as follows. When the application determines a print operation is necessary, it opens the printer driver object 306 and controls the processor to send bit-mapped content (e.g., text, graphics, etc.) to the printer object 300. The content is then printing, after which the printer driver object is closed. An exception to this operation may occur if one of the following events is sensed: the printer door is open, the printer paper is out, the thermal print head overheats, or the buffer is full. If the printer door is open, a door open event is signaled and the printer is turned off. If printer paper is out, a paper out event is signaled and the printer is turned off. If the thermal head overheats, the printer is paused and a wait period (e.g., 10 seconds) is initiated, after which printing is resumed. If the buffer is full, the thread trying to write to the printer is paused and a wait period (e.g., 10 second) is initiated, after which the object resumes accepting input if possible.

Preferably, the application uses existing graphics libraries (or embedded 3D engine conversion libraries) to convert any images or fonts to a one bit bitmap buffer that is processed by the printer driver to print a monochrome image on the thermal printer.

Control preferably is via IOCTL codes. For bitmap graphics, an IOCTL is used to transfer images directly into the frame buffer. FIG. 4 illustrates a representative data structure to transfer bitmap graphics to the driver.

Additional control operations may be implemented as follows:

A printer monitor thread executes regularly to monitor the door, paper, temperature and voltage. The monitoring thread may operate as follows:
1. Sleep for N millisecond.
2. Update status of door-open and paper-out sensors.
3. Turn off any thermal strobe currently in progress.
4. Printer voltage is checked. This is used for subsequent calculations of strobe pulse widths and temperature.
5. Printer head temperature is checked. This is used in any subsequent calculations of strobe pulse width, and also used to shut down the power to the printer head in the case of overheating.
6. If the thermal head has overheated, wait a few seconds to allow it to cool off.

A printer step and strobe thread executes repeatedly to drive the stepper motor and thermal head. The stepping and strobing thread may operate as follows:
1. Wait for printer activity (change in door, paper, thermal overheat, or data ready status)
2. Send the next line of dots out of the frame buffer.
3. Feed and latch the data for the next strobe.
4. Start the next strobe
5. Wait for the strobe to complete.
6. Motor half-step.
7. Feed and latch the same data for another strobe.

8. Start the next strobe
9. Wait for the strobe to complete
10. Motor half-step.

In a preferred embodiment, the motor lines are pulsed at 10-20 kHz all the time, using the PWM output of a GP timer as an enable line for the motor controls. This allows the motor to pause for more than 2.5 milliseconds per step.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While given components of the system have been described separately, one of ordinary skill will appreciate that some of the functions may be combined or shared in given instructions, program sequences, code portions, and the like. While the disclosed subject matter has been described in the context of a method or process, the subject disclosure also relates to apparatus for performing the operations herein. This apparatus may be specially constructed for the required purposes, or it may comprise a general-purpose computing entity selectively activated or reconfigured by a stored computer program stored. Such a computer program may be stored in a computer readable storage medium, such as, but is not limited to, any type of disk including an optical disk, a CD-ROM, and a magnetic-optical disk, flash memory, a read-only memory (ROM), a random access memory (RAM), a magnetic or optical card, or any type of non-transitory media suitable for storing electronic instructions.

While given components of the system have been described separately, one of ordinary skill will appreciate that some of the functions may be combined or shared in given instructions, program sequences, code portions, and the like.

Having described our invention, what is claimed is as follows:

1. An apparatus self-contained within a housing, comprising:
   a hardware processor comprising a first general purpose input/output (GPIO) bus and a second GPIO bus;
   computer memory in which is stored an operating system and an application;
   a printer directly connected to the first and second GPIO buses of the hardware processor; and
   control logic executed in the hardware processor in response to a print request received from the application to generate a set of control signals;
   wherein the control logic outputs on the first GPIO bus pulse-width modulated (PWM) control signals operable to control a motor of the printer, the PWM control signals comprising pulses in the range from 10 KHz to 20 KHz generated by a general purpose timer coupled to an enable line of the motor, and the control logic outputs on the second GPIO bus bit-map image control signals associated with the content that is to be printed by the printer, and wherein the control logic comprises a printer object configured to communicate with an application programming interface (API) associated with the application and to communicate with at least one object configured to control the printer.

2. The apparatus as described in claim 1 wherein the operating system is Android.

3. The apparatus as described in claim 1 wherein the printer is a thermal printer.

4. The apparatus as described in claim 1, further comprising voltage level shifting circuitry coupled to the second GPIO bus to increase the voltage levels of the bit-map image control signals.

5. The apparatus as described in claim 1 further including safety circuit logic coupled to the hardware processor and operative to detect a signal indicative of at least one operating anomaly associated with the printer.

6. The apparatus as described in claim 5 wherein the control logic is further operative to receive the signal and, in response, inhibit operation of the printer until the at least operating anomaly is indicated to be cleared.

7. The apparatus as described in claim 6 wherein the at least one operating anomaly is one of: an open printer door, and out-of-paper condition, a thermal print head overheats, and a full printer buffer.

8. The apparatus as described in claim 1 wherein the control logic comprises a set of software objects.

9. The apparatus as described in claim 8 wherein the set of software objects includes a printer driver object.

10. The apparatus as described in claim 9 wherein the printer driver object is operative to provide hardware-specific initialization, creating a printer execution thread, generating the set of control signals, and outputting the set of control signals to the hardware processor input/output bus.

11. The apparatus as described in claim 1 wherein the application is one of: an order management application, and an invoice/payment application.

12. An apparatus self-contained with a housing, comprising:
    a hardware processor comprising a first general purpose input/output (GPIO) bus and a second GPIO bus;
    computer memory in which is stored an Android-based operating system;
    a payment application;
    a printer directly connected to the first and second GPIO buses of the hardware processor; and
    control logic executed in the hardware processor in response to a print request received from the payment application to generate a set of control signals;
    wherein the control logic outputs on the first GPIO bus pulse-width modulated (PWM) control signals operable to control a motor of the printer, the PWM control signals comprising pulses in the range from 10 KHz to 20 KHz generated by a general purpose timer coupled to an enable line of the motor, and the control logic outputs on the second GPIO bus bit-map image control signals associated with the content that is to be printed by the printer, and wherein the control logic comprises a printer object configured to communicate with an application programming interface (API) associated with the payment application and to communicate with at least one object configured to control the printer.

13. The apparatus as described in claim 12 wherein the printer is a thermal printer.

14. The apparatus as described in claim 12, further comprising voltage level shifting circuitry coupled to the second GPIO bus to increase the voltage levels of the bit-map image control signals.

15. The apparatus as described in claim 12 further including safety circuit logic coupled to the hardware processor and operative to detect a signal indicative of at least one operating anomaly associated with the printer.

16. The apparatus as described in claim 15 wherein the control logic is further operative to receive the signal and, in response, inhibit operation of the printer until the at least operating anomaly is indicated to be cleared.

17. A device self-contained within a table-side supported housing, comprising:

a processor having a first bus and a second bus;
   computer memory supporting an operating system;
   a printer directly connected to the first and second buses; and
   software executed by the processor to generate and output control signals that drive the printer directly to print bit-mapped content without requiring an operating system-specific printer driver, wherein software outputs on the first bus pulse-width modulated (PWM) control signals operable to control a motor of the printer, the PWM control signals comprising pulses in the range from 10 KHz to 20 KHz generated by a general purpose timer coupled to an enable line of the motor, and the software outputs on the second bus bit-map image control signals associated with the content that is to be printed by the printer, and wherein the software comprises a printer object configured to communicate with an application programming interface (API) associated with an application executed by the processor and to communicate with at least one object configured to control the printer.

18. The device as described in claim 17 wherein the printer is a thermal printer.

19. The device as described in claim 17 wherein the operating system is Android.

20. The device as described in claim 17 further including an order management or payment application.

* * * * *